United States Patent [19]

Miller et al.

[11] Patent Number: 5,289,552
[45] Date of Patent: Feb. 22, 1994

[54] TEMPERATURE COMPENSATED FIBER FABRY-PEROT FILTERS

[75] Inventors: Calvin M. Miller, Atlanta; Jeffrey W. Miller, Kennesaw, both of Ga.

[73] Assignee: Micron Optics, Inc., Atlanta, Ga.

[21] Appl. No.: 929,836

[22] Filed: Aug. 12, 1992

Related U.S. Application Data

[63] Continuation-in-part of Ser. No. 801,450, Dec. 2, 1991, Pat. No. 5,212,745.

[51] Int. Cl.$^5$ .................................................. G02B 6/38
[52] U.S. Cl. ......................................... 385/73; 385/72; 356/352
[58] Field of Search ........................ 385/27, 31, 73, 50, 385/72; 356/352

[56] References Cited

U.S. PATENT DOCUMENTS

| | | | |
|---|---|---|---|
| 4,545,644 | 10/1985 | DeVeau, Jr. et al. | 385 64/ |
| 4,813,756 | 3/1989 | Frenkel et al. | 385/73 |
| 4,830,451 | 5/1989 | Stone | 385/31 |
| 4,861,136 | 8/1989 | Stone et al. | 385/27 |
| 4,923,273 | 5/1990 | Taylor | 385/48 |
| 5,062,684 | 11/1991 | Clayton et al. | 385/27 |
| 5,073,004 | 12/1991 | Clayton et al. | 385/27 |

FOREIGN PATENT DOCUMENTS

| | | |
|---|---|---|
| 0457484 | 5/1991 | European Pat. Off. |
| 0437963 | 12/1991 | European Pat. Off. |

OTHER PUBLICATIONS

Miller et al. Elect. Lett. 26(25):2122-2123, 6 Dec. 1990.
Stone et al., Elect. Lett. 23(15):781-783, 16 Jul. 1987.

*Primary Examiner*—Frank Gonzalez
*Attorney, Agent, or Firm*—Greenlee and Winner

[57] ABSTRACT

The present invention provides fiber Fabry-Perot filters having an adjustable temperature coefficient. Passive means and adjustable means for changing the temperature coefficients of FFPs are provided. These means allow adjustment of the temperature coefficient of the filter to minimize wavelength (or frequency) drift as a function of temperature. The means for temperature coefficient adjustment described herein are particularly useful in combination with electronic means for changing the cavity length, such as piezoelectric transducer elements. Controlling the thicknesses of epoxy used to attach PZTs in the filter fixture has been found to lead to improved reproducibility of passive temperature compensation. An adjustable means for changing the temperature coefficient of a FFP after its construction by varying the points of contact between the filter ferrules and the filter fixture is also provided. Combination of the means of temperature coefficient adjustment described herein result in significantly improved yields of FFPs having temperature drift less than about 0.1 FSR/15° C.

37 Claims, 6 Drawing Sheets

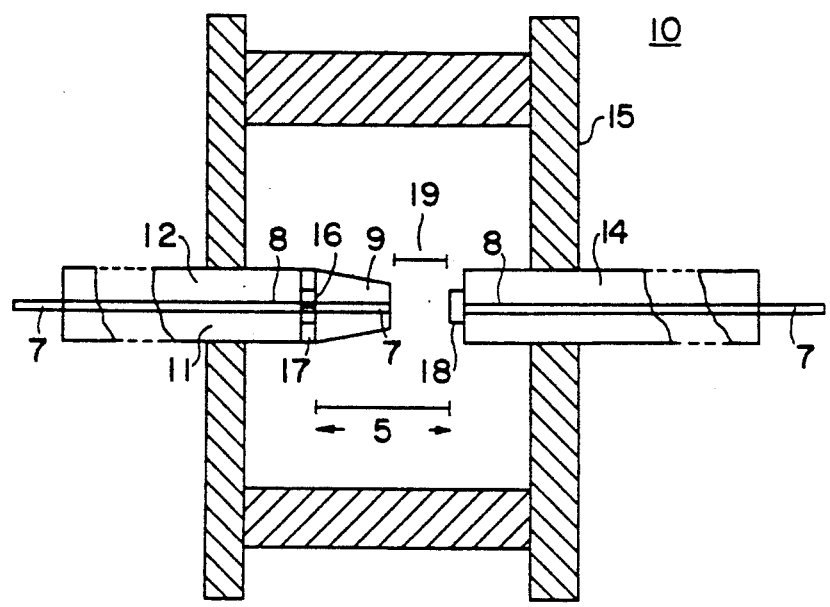
F I G. 1
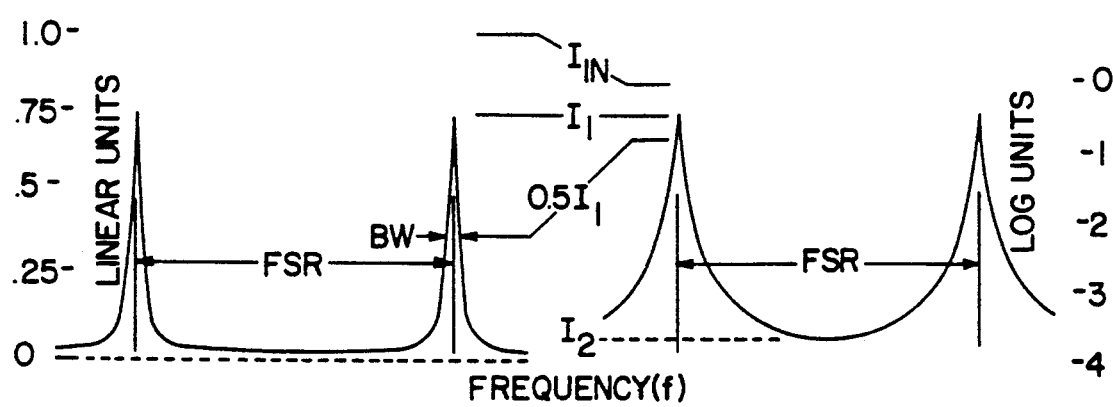
F I G. 2

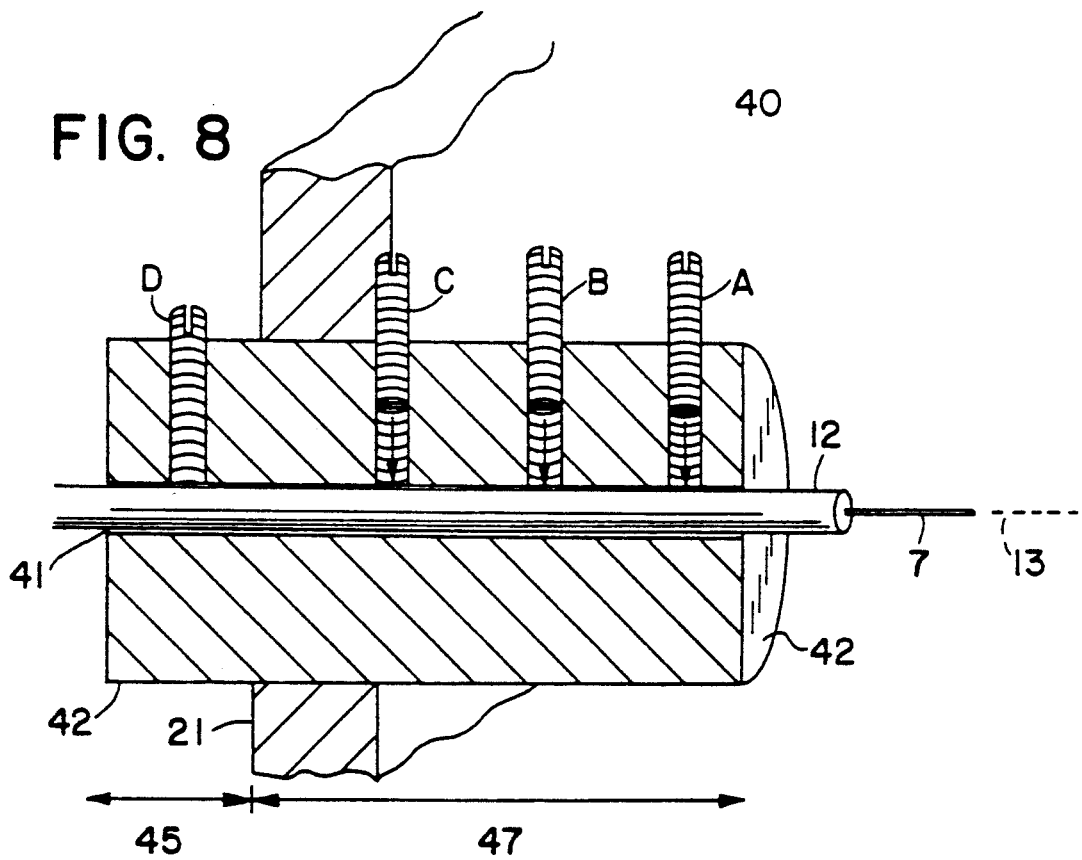

TEMPERATURE COMPENSATED FIBER FABRY-PEROT FILTERS

This application is a continuation-in-part of U.S. Pat. application Ser. No. 07/801,450, now U.S. Pat. No. 5,212,745 issued May 18, 1993, which is incorporated in its entirety by reference herein.

FIELD OF THE INVENTION

This invention is in the field of fiber optics and relates specifically to means for temperature compensation of optical fiber filters.

BACKGROUND OF THE INVENTION

Transmission of information by the use of light over optical fibers is widely used in long-haul telecommunication systems. Optical signals are generated, transported along optical fibers and detected to regenerate the original electronic signal with as little change as possible. Fibers are substituted for other transmission media and all signal processing is done electronically, resulting in lowered cost and high quality digital transmission.

As fiber optic applications technology develops direct optical processing of signals without conversion to electronic signals will be required. Optical fiber systems will be applied in computer networks, for example, in multiple access computer networks. Such applications will require optical fiber devices such as amplifiers, multiplex/demultiplexers, splitters, couplers, filters, equalizers, switches and other optical signal processors.

An economical low-loss, easily and reproducibly manufactured single-mode optical fiber filter, the design of which can be adapted to a desired bandwidth, FSR and finesse is an important component for such fiber optic systems. A fiber Fabry-Perot (FFP) interferometric filter is such a component.

The Fabry-Perot (FP) Interferometer was first described by C. Fabry and A. Perot in 1897 (Ann. Chem. Phys., 12:459–501) and has since found wide use in a variety of applications of optical filters. The basic structure and operation of the FP interferometer is well-known in the art and is described in many physics and optics texts (see, for example, E. Hecht "Optics" 2nd. Edition (1987) Addison-Wesley, Reading MA, p. 369). This interferometer consists of an optical cavity formed between two typically highly-reflective, low-loss, partially transmitting mirrors. Lenses are typically used to collimate divergent optical beams for processing through the FP interferometer.

While single-mode optical fibers can be used with lensed conventional FP interferometers, lenses with large beam expansion ratios are required and result in reduced stability and poor optical performance. The adaptation of FP cavities for optical fiber filters had been hindered by the lack of practical designs for FFPs with appropriate optical properties. Recently, FFPs which possess optical properties suitable for telecommunication applications have been described. These FFPs consist of two highly-reflective, preferably plane-parallel mirrors, forming the optical cavity through at least a portion of which, in most cases, a length of single-mode optical fiber extends. This basic design eliminates the need for collimating and focusing lenses, improves stability and optical performance and makes the FFPs compatible with single-mode optical fibers and other fiber devices.

In 1987, J. Stone and L. W. Stulz described three configurations of FFP interferometric filters (Elect. Lett., 23(15):781–783, 1987) that span a wide spectrum of bandwidths and tuning ranges. The Type I FFP is a long cavity FFP in which mirrors are deposited at the ends of a continuous fiber. The minimal cavity length is about 1 cm (FSR of about 10 GHz), so that this long cavity device is not necessarily important for telecommunication applications. In the Type I FFP, the fiber can be stretched by piezoelectric transducers (PZTs) to produce tuning of the bandwidth (BW) over the free spectral range (FSR).

The Type II FFP of Stone and Stulz is a gap resonator which has no optical fiber inside the optical cavity and so can exhibit significant losses. Due to such losses, the useful cavity length of this type of FFP is less than about 5 $\mu$m. The Type II FFP is also not well-suited for telecommunication applications.

The Type III FFP is better suited to telecommunication applications than the Type I and VI FFPs. This type of FFP has an internal waveguide interposed between external fiber ends. Mirrors are positioned at an external fiber end and at one end of the waveguide. The waveguide is comprised within the optical cavity. The optical cavity also contains a fiber gap, for example between the waveguide and one of the external fiber ends, the width of which is fixed or can be changed to tune the filter.

The ferrule components and waveguide of Type II and III FFPs must be axially aligned to high precision in order to minimize transmission loss. Type VI and III FFPs are the subject of U.S. Pat. No. 4,861,136. This patent relates to FFPs which are tuned by use of PZTs to change the cavity length. In order to use PZTs to change resonance cavity length without detriment to alignment, elaborate alignment brackets and fixtures are necessary.

U.S. Pat. No. 5,062,684 describes an improved tunable FFP filter in which the resonance cavity is formed by two wafered ferrules with mirrors embedded between the wafer and the ferrule and axially disposed optical fibers. The two ferrules are positioned in the filter configuration with mirrors opposed and the optical fibers of the ferrules aligned. The resonance cavity formed between the embedded mirrors contains a fiber gap between the wafered ends of the ferrules. The ferrule combination is held in alignment by an alignment fixture including piezoelectric transducers which function to change the resonance cavity length on application of a voltage to the transducer. A support fixture useful for holding a FFP ferrule assembly in axial alignment is described in EP patent application 0 457 484. This fixture also provides a means for minor adjustment of alignment as well an electronic means employing PZTs transducers for changing the cavity length.

A major problem of FFP filters is signal loss due to wavelength drift as a function of the change in cavity length of the filter with temperature. An uncompensated FFP, like that of U.S. Pat. No. 5,062,684 or EP application 0 457 484, can exhibit a relatively large change in cavity length, of the order 0.05 $\mu$m/°C. This can represent a drift of a full FSR (free spectral range) over 15° C. See C. M. Miller and F. J. Janniello (1990) Electronics Letters 26:2122–2123. Control circuitry has been employed with PZT-tuned FFPs to lock the filter onto a wavelength over a wide temperature range (I. P. Kaminow (1987) Electronics Letters 23:1102–1103 and D. A. Fishman et al. (1990) Photonics Technology Letters pp. 662-664). In these systems, control voltage swings of several tens of volts were required to compensate for the relatively large change in cavity length with temperature. Wavelength locking of FFP filters can prevent signal loss, however since approximately 20 volts applied to a PZT is needed to tune through an FSR, a total power supply range of about 60 volts is needed to maintain the wavelength lock over an operationally useful temperature range of about 30° C. (Fishman et al. supra).

Miller and Janniello (1990) supra described passive temperature compensation of PZT-tuned FFPs. Since PZTs require a higher voltage at higher temperature to maintain a given length, cavity length effectively decreases with increasing temperature (with constant voltage). Thus, the PZT-tuned FFP has a negative temperature coefficient. Addition of a material having a positive temperature coefficient in series with the PZTs, for example aluminum blocks, was found to compensate for the negative temperature coefficient of the PZTs. This method of passive compensation significantly reduced the voltage requirements for FFP locking circuits such that $+/-12$ volt power supplies, such as are conventionally employed in computer systems, could be employed for locking.

The manufacturing yield of highly accurate, passively compensated FFPs is low. This is due in part to the fact that it is difficult to obtain the required degree of passive temperature compensation in any particular filter. The filter assembly must be entirely constructed before the extent of compensation achieved can be tested. With such passive compensation there is no means for adjusting the temperature coefficient of the filter after the filter has been fabricated. FFPs are often over or under compensated.

The present invention provides FFPs which overcome the difficulties described above. In the filters of this invention, the temperature coefficient can be selectively varied after fabrication of the filter in order to minimize the variation of the cavity length as a function of temperature. The filter support fixtures and methods described herein provide FFPs which on average have a significantly lower temperature coefficient than previously described temperature compensated FFPs. Application of the methods herein for filter fabrication and the use of the support structures herein result in significantly improved manufacturing yield of FFPs having desirable optical characteristics and low thermal coefficients.

SUMMARY OF THE INVENTION

It is an object of this invention to provide temperature compensated fiber Fabry-Perot filters (FFPs) that are stable to wavelength drift over a useful range of device operating temperatures (i.e, from about 0°-75° C.). Means for adjusting the temperature coefficient of an FFP are provided. Preferred filters have a wavelength drift less than or equal to 0.1 FSR/15° C. It is also an object of this invention to provide temperature compensated filters that are easily and reproducibly constructed to meet desired optical characteristics and maintain temperature stability.

In the furtherance of these objects, this invention provides temperature compensated FFPs and means for adjusting the temperature coefficient of FFPs.

In one embodiment, this invention provides temperature compensated tunable FFPs which comprise piezoelectric transducer means for changing the resonance cavity length of the filter in which the PZTs are adhesively fixed to the alignment fixture of the filter with precisely controlled amounts of an adhesive material having a positive temperature coefficient, such as an epoxy adhesive. The filters comprise a fiber ferrule assembly which typically contains two ferrules which are cylindrical elements each having a substantially axial bore for receiving an optical fiber. The axial bore of a ferrule defines the longitudinal axis of the ferrule. Each ferrule has a mirror which is transverse to its longitudinal axis at an optical fiber end. The ferrule assembly comprises an optical resonance cavity formed between the two opposed reflective surfaces of the mirrors of two ferrules. The optical cavity contains an optically continuous fiber which may or may not contain a fiber gap. Each ferrule is inserted into a ferrule support element. Both ferrule supports are themselves supported and held within an alignment fixture. A ferrule support comprises an essentially cylindrical straight and smooth passageway for receiving the ferrule and means for securing the ferrule within the passageway.

When the optical cavity contains a fiber gap, the ferrule supports are held within an alignment fixture which functions to hold the ferrules in essentially axial alignment with respect to each other, such that the optical fibers in the optical cavity are aligned to allow an optical signal to traverse the optical cavity. In this case, one or both of the ferrule supports can have a means for adjusting the relative axial alignment of the ferrules to change the relative alignment of the optical fibers of the filter. In the alignment fixture, the ferrule supports are connected to each other by a bridging means which functions to hold the ferrule supports such that the optical fibers of the ferrules held within the supports are aligned. The bridging means also comprises a means for electronically changing the length of the optical cavity, such as PZT transducer means. The PZT means is positioned with respect to the ferrules and supports such that as the PZT means expands or contracts the optical cavity of the filter expands or contracts, respectively, in a direction substantially parallel to the longitudinal axes of the ferrules. The bridging means comprises one or more PZTs, particularly stacked PZTs, adhesively fixed between brackets which extend outwardly from the longitudinal axis of the supports. A PZT is bonded between a pair of aligned brackets from each support. One or more PZTs extend across the resonance cavity of the filter and function in concert on application of an appropriate voltage to the PZTs to change the length of the resonance cavity. A PZT is bonded between the support brackets with a precisely controlled amount of an adhesive having a positive temperature coefficient, preferably an epoxy adhesive. The amount of epoxy in the joint through which a PZT is attached to the support bracket is precisely controlled in order to add sufficient positive temperature coefficient material (i.e., adhesive) to the filter between the support brackets to substantially balance the negative temperature coefficient effect of the PZT. The PZT means are disposed around the longitudinal axis of the ferrules of the filter such that the cavity length is changed essentially along the longitudinal axis of the filter without substantial detriment to optical fiber alignment in the filter. In specific embodiments, the alignment fixture of a filter contains a plurality of PZT bridges formed from stacked rectangular PZTs which function to change the resonance cavity length and tune the filter. Such PZT bridges are preferably symmetrically or equiangularly disposed around the longitudinal axis of the filter to achieve the desired essentially longitudinal change in cavity length. More than one PZT can be adhesively bonded between the same pair of support brackets. In an alternative embodiment, a single cylindrically-shaped PZT which expands and contracts along its longitudinal axis, i.e. the axis of the cylinder, can be employed to bridge the ferrule supports of the filter and function to change the optical cavity length of the filter.

When the optical cavity contains a continuous fiber extending between the mirrors that form the cavity, ferrule alignment is not critical, and ferrules need not be supported in alignment in the fixture. In this case, the ferrule supports and fixture function to hold the ferrules, which are connected via the continuous optical fiber, in position relative to each other and the PZT bridges such that the intracavity fiber can be stretched by expansion of the PZTs resulting in a change in the cavity length.

Balancing the amount of negative and positive temperature coefficient material between the brackets extending from the ferrule supports results in a minimum cavity length temperature coefficient and a minimum wavelength drift of the filter as a function of temperature. The amount of adhesive in the joints is readily controlled by controlling the thickness of an adhesive layer over a defined joint area between the PZT and the support bracket. The thickness of the adhesive layer can be readily controlled by insertion of a non-deformable spacer of precisely controlled thickness between the PZT and the support bracket prior to introduction of the adhesive between the PZT and the bracket and application of substantially uniform force across the joint. Excess adhesive is then removed from the fixture before it cures to form a bond. In the filters of this invention the amount of adhesive applied to the PZT joints to the support brackets is such that the wavelength drift of the filter is 0.1 FSR/15° C. or less. The filters of this invention can combine temperature compensation elements, for example blocks of positive temperature coefficient materials, like aluminum, in addition to controlled adhesive layers in order to achieve the desired low wavelength drift with temperature.

In a second embodiment, this invention provides FFP filters with an adjustable means for changing the filter's temperature coefficient. These FFPs have a means for adjusting the temperature coefficient of the FFP which allows fine adjustment of the temperature coefficient in a passively temperature compensated FFP filter, such as, for example, those described herein above. The means for adjusting the temperature coefficient comprises within the alignment fixture a means for changing the points of contact between the ferrule and the ferrule support body.

In order to describe the temperature coefficient adjustment feature of the FFPs of this invention, an inboard section and outboard section of the filter are defined as illustrated in FIG. 8. The inboard and outboard sections of the filter are defined along the longitudinal length of the filter by the ends of the PZTs, i.e. the joints between the PZTs and the brackets extending from the ferrule support. The inboard section extends the length of the PZTs and each outboard section extends from one end of the PZT to the adjacent end of the filter. The brackets and their joints to the PZTs are positioned along the ferrule support such that each ferrule support has an inboard and an outboard section. The ferrule support has means both in the inboard section and in the outboard section of the filter for making a rigid contact between the support and the ferrule in the support passageway. Changing these contact points effectively increases or decreases the amount of positive temperature coefficient material which contributes to the cavity length temperature coefficient. Dependent upon the types of materials used in the ferrules, supports and alignment fixtures, changing the contact points can allow adjustment over a range of about ±0.2 FSR/15° C.

This invention provides an exemplary FFP with adjustable temperature coefficient in which at least one of the ferrule supports contains a means for varying the contact points between a ferrule and the support. Specifically provided is a ferrule support having a straight and smooth, essentially cylindrical passageway for receiving a ferrule and having a plurality of adjustable means along the longitudinal length of the support for contacting the ferrule and securing that element within the passageway of the support. The support contains at least one such means for contacting the ferrule in the inboard section of the filter as defined above and at least one such contacting means in an outboard section of the filter, as defined above. The specific filters of this invention comprise a plurality of mounting screws positioned in the ferrule support along its longitudinal length, which can traverse the support body and enter the passageway to contact the ferrule in the passageway and secure the ferrule to the support body at a desired point along the longitudinal length of the support. A contact is made between the ferrule and the support by tightening a mounting screw and the contact is broken by loosening the mounting screw. It is preferred that the ferrule is in rigid contact with the support body at two positions along the support passageway to rigidly and securely hold the ferrule in alignment in the filter.

In a specific embodiment of this invention, an FFP comprises a ferrule assembly having two ferrules, an alignment fixture having two ferrule supports, each with cylindrical passageways for holding each ferrule in alignment, an adjustable means within a support for changing the relative alignment of the optical fibers of the ferrules within the filter, PZT transducer means for changing the resonance cavity length without significant detriment to the alignment of the optical fibers, a means for approximately balancing the temperature coefficient of the PZTs, and an adjustable means for varying the temperature coefficient of the filter by varying the contact points between a ferrule support and ferrule therein. More specifically, the FFPs of this invention combine the use of controlled amounts of positive temperature coefficient adhesives to bond the PZTs in the alignment fixtures for passive temperature compensation of the filter with a means for adjusting the temperature coefficient of the FFP after its construction. It is preferred that passive means decrease the magnitude of the cavity length temperature coefficient of the filter to at least about 0.2 FSR/15° C. The adjustable means for changing the temperature coefficient then functions to decrease the magnitude of the cavity length temperature coefficient to less than about 0.1 FSR/15° C. The means for adjusting the temperature coefficient is preferably a means for changing the points of contact as described above between the support and a ferrule therein.

BRIEF DESCRIPTION OF THE DRAWINGS

FIG. 1 is a schematic representation of a tunable FFP filter.

FIG. 2 is a schematic representation of an FFP transmission spectrum which indicates various spectral characteristics of the transmission. The following definitions apply to FIG. 2: $I(f)=k/\{1+[(2F/\pi)\sin(2\pi nl_c/\lambda)]^2\}$; Finesse, (F)=Free Spectral Range, (FSR)/Bandwidth, (BW); FSR=$c/2nl_c$, (n=cavity index, $l_c$=cavity length); Insertion Loss=$-10 \log (I_1/I_{in})$; BW is Full Width at Half Maximum; $f=c/\lambda$, ($c=3\times10^8$ m/sec); $\Delta f = -(c/\lambda^2)\Delta\lambda$; Contrast Factor (C)=$-10 \log (I_2/I_1)$=$10 \log [1+(2F/\pi)^2]$.

FIG. 8 is a cross-sectional view of a ferrule support of the FFP of FIG. 7. This ferrule support provides a means for adjusting the temperature coefficient of the filter by changing the points of contact between one of the ferrules and the support.

DETAILED DESCRIPTION OF THE INVENTION

Figure 3A:
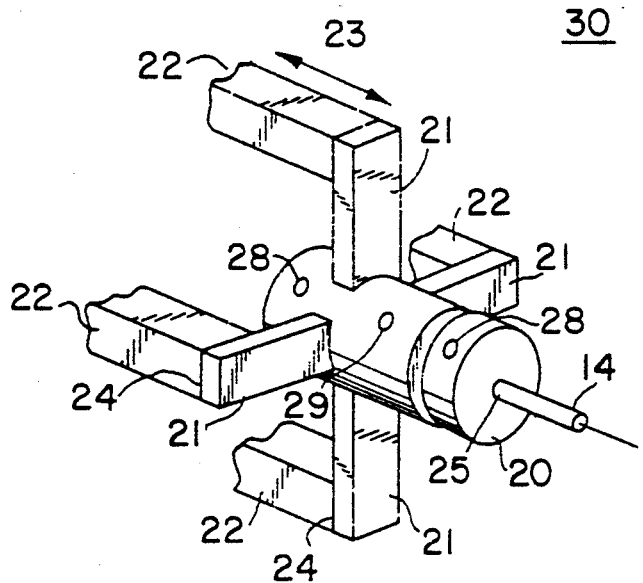
FIG. 3A is a perspective representation of a prior art FFP that is not temperature compensated.

An FFP interferometer consists of two plane-parallel reflective surfaces or mirrors, preferably highly-reflective, separated by a length of single-mode fiber, $l_c$, with two single-mode fiber pigtails which are mounted within cylindrical members to form fiber ferrules.

FIG. 1 schematically shows a typical FFP filter configuration (10) with two ferrules (12 and 14) aligned within a supporting fixture (15). Each ferrule contains a substantially axial bore (8) along a longitudinal axis (13) for receiving an optical fiber (7). The FFP shown contains a wafered ferrule (12) in combination with a mirror-ended ferrule (14). The wafered ferrule has a mirror (16) embedded between the ferrule (11) and the wafer (9). The axial optical fibers of the wafer and the ferrule are aligned and the two elements are bonded with epoxy (17). The embedded mirror (16) and the mirror (18) deposited at the end of the ferrule (14) form the resonance cavity of the FFP filter, indicated by 5. In the FFP exemplified in FIG. 1, there is a small gap in the optical fiber (19) within the resonance cavity. The length of this gap can be varied to tune the wavelength transmitted through the filter. The optical fibers of the ferrules of the FFP are aligned so that an optical signal can traverse the filter. The FFP ferrule assembly of FIG. 1 has been described in U.S. patent application Ser. No. 07/821,484. Alternative FFP ferrule assemblies having a fiber gap within the resonance cavity include FFPs having two mirror-ended ferrules or two wafered ferrules with embedded mirrors. FFP filters can also have a continuous fiber throughout the resonance cavity. In a FFP having a continuous fiber, the filter can be tuned by stretching the fiber. The characteristics and applications of various fiber ferrule configurations for FFPs have been discussed in U.S. patent application Ser. No. 07/821,484 and in U.S. Pat. Nos. 5,062,684 and 4,861,136 which are incorporated by reference in their entirety herein.

FIG. 2 schematically show the characteristics of transmission (frequency) of a typical FFP of length, $l_c$. The fractional transmitted power, $I_t/I_{in}$, through the optical cavity is $$I(f) = \frac{k}{1 + \left(\frac{2F}{\pi} \sin[2\pi nl_c/\lambda]\right)^2} \quad (1)$$

where $l_c$ is the cavity length which is the length of single-mode optical fiber and any fiber gaps or spacing between the mirrors which form the cavity, n is the index of refraction of the cavity material, F is the finesse of the cavity and k is the insertional loss. For the lossless case, k is 1 and the ideal F is dependent only on the reflectivities of the mirrors (R, where the reflectivities of the mirrors are assumed to be equal) and $$F = \frac{\pi\sqrt{R}}{(1-R)} \quad (2)$$

For a fixed value of n, when $nl_c=m\lambda/2$, where m is an integer, equation 1 has maxima corresponding to a resonance condition within the cavity. Incident light with $\lambda$ that is an integer multiple of the cavity optical path length ($nl_c$) is transmitted with little attenuation. Incident light of other wavelengths is highly attenuated. For a given m, changing $l_c$ or $\lambda$ results in a shift of all transmission maxima as shown in FIG. 2. Insertion loss is the minimum loss through the FFP and is equal to $-10 \log k$ or $-10 \log (I_1/I_{in})$ referring to FIG. 2. The difference between the frequencies of the resonance peaks, for constant $l_c$ and $\lambda$, is the free spectral range (FSR)=$c/2nl_c$, where $c=3\times10^8$ m/s. An FFP is tuned between successive resonance maxima by, for example, changing $l_c$. (Alternatively, tuning of the FFP can be accomplished by changing n.) The bandwidth (BW) is the full width at half maximum as indicated in FIG. 2. The finesse of the filter, F=FSR/BW, can be measured experimentally by measuring the ratio of FSR to BW from the transmission curves generated by varying $l_c$ with constant $\lambda$. Measuring F in this manner accounts for all non-dispersive losses including mirror absorption, diffraction and alignment losses. If $\lambda$ is varied to generate transmission curves, dispersive properties of the mirrors, fibers, and cavity modes are also included in the measured FSR.

To achieve a low-loss filter, high-tolerance alignment of the optical fibers through the filter is required. The alignment necessary to achieve low-loss fixed wavelength FFPs have required the use of high-precision brackets (Stone and Stulz and Clayton and Miller). A fixed FFP is intended to transmit a fixed wavelength (or frequency) and to be operated at a substantially constant optical cavity length between the mirrors. Many applications of FFPs require that the resonance cavity length be variable, e.g., to achieve wavelength tuning. A tunable FFP is a filter in which the wavelength or frequency of the transmission output of the filter is changed, shifted or tuned by changing the optical path length of the resonance cavity of the FFP. In some fixed FFP applications, it may be desirable that the FFP be capable of small cavity length changes, for example to adjust to small source fluctuations. A filter that is tunable over a small range, e.g., less than 30% of an FSR is a narrowly tunable or trimable FFP. Although FFPs can be tuned by changing the temperature of the FFP, the present invention particularly relates to temperature compensation of FFPs in which the cavity length is changed, for example, by fiber stretching or by changing the length of a fiber gap. Temperature compensation minimizes the effect of ambient temperature changes on cavity length.

For tunable operation, the means used for alignment of an FFP must retain high-precision alignment but allow longitudinal variation in the cavity length so that the filter can be tuned. One solution to these exacting requirements has been the combination of high-precision brackets with a means for electronically stretching the resonance cavity.

Figure 3B:
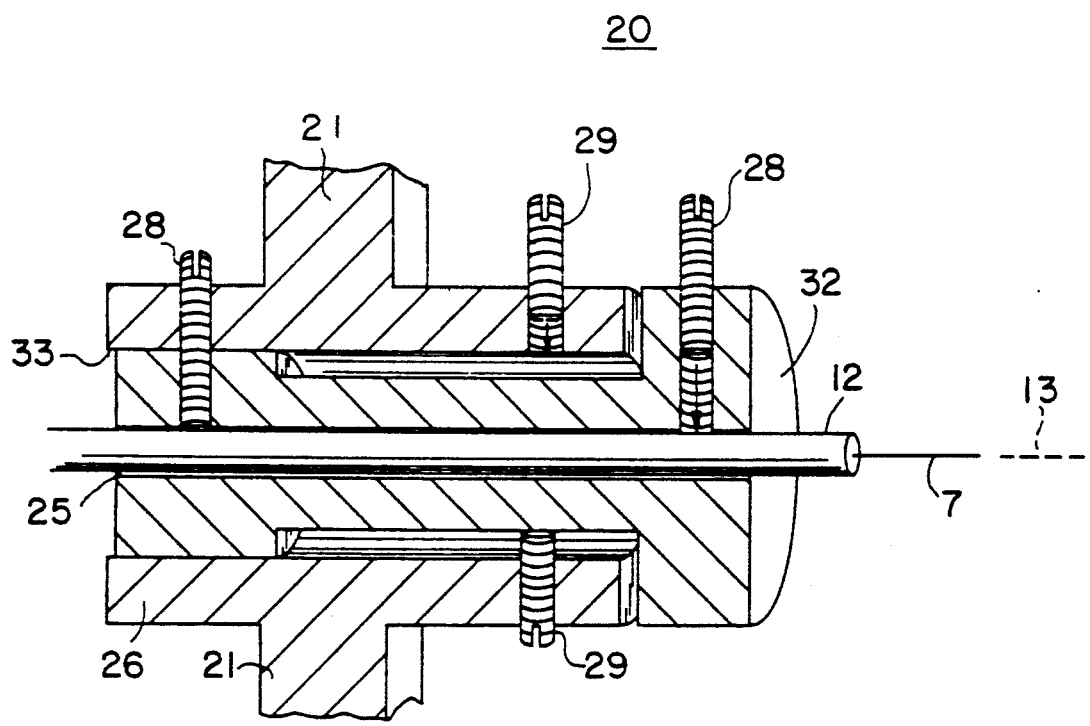
FIG. 3B is a cross-sectional view of a prior art ferrule support.

FIG. 3A shows a perspective view of one half of a symmetrical prior art FFP alignment fixture (30) which provides PZTs (22) to vary the cavity length of the filter. This fixture, which is descried in published EPO application 457,484, also provides for adjustment of ferrule alignment. The alignment fixture comprises two identical ferrule supports (20) connected to each other by a bridge (22 and 21) comprising PZTs (22) which are employed to change the cavity length. On application of a voltage to the PZTs, they expand or contract in the direction indicated (23). The alignment fixture comprises two identical ferrule supports (20) each having a passageway (25) for receiving a ferrule (14). Each ferrule support typically has brackets (21) which extend outwardly from its cylindrical body. Each ferrule support has the same number of brackets disposed around the support. The brackets of the two supports are aligned in the fixture, and between each pair of aligned brackets a piezoelectric transducer (22) is adhesively bonded (24). Application of a voltage to the piezoelectric transducers changes the length of the cavity of the filter. FIG. 3B gives a cross-sectional view of the ferrule support (20) of the fixture of FIG. 3A. A support has a cylindrical passageway (33) for receiving a stepped sleeve (32) with passage (25) into which the ferrule is received. Stepped sleeve 32 has a smaller diameter portion (34). Each ferrule support has mounting screws (28) which traverse the body of the support (26) and the sleeve to directly contact the ferrule (e.g. 12) within the passageway and secure it within the fixture. Each support also has alignment screws (29), typically four, symmetrically disposed around the longitudinal axis (13) of the support. Each of these alignment screws can be tightened to contact the stepped sleeve to slightly deform it to change the relative axial alignment of the ferrules within the alignment fixture. Adjusting the alignment screws of one or both of the ferrule supports allows the alignment of the optical fibers of the filter to be changed.

FFPs like that of FIG. 3 show a significant variation in cavity length as a function of temperature which results in a significant wavelength drift as a function of temperature. For an FFP, a cavity length thermal coefficient, $a_{lc}$, reflecting the change in cavity length/C.° can be defined in terms of the change in wavelength (e.g., as a percent of an FSR) with temperature. The larger this coefficient is, the greater is the change in cavity length exhibited by the FFP with temperature. A negative coefficient, as is conventional, indicates that cavity length will decrease with temperature. The cavity length temperature coefficient of a filter like that of FIG. 3 is in the range of 1 FSR /15° C. For stacked PZTs such as those used in the filter of FIG. 3, a higher voltage is required at higher temperatures to achieve the same change in length. Stacked PZTs thus effectively have a large negative temperature coefficient. A filter which varies by a FSR over such a small temperature range is not very useful for applications over a typical range of device operating temperatures (i.e., about 0°-75° C.). While it is possible to employ wavelength locking techniques (Miller and Janniello (1990) supra) to prevent significant signal loss from wavelength drift with temperature, high voltage power supplies, i.e., +/−60 volts, are required to achieve wavelength control over a minimally reasonable temperature range of 60° C.

Passive temperature compensation can be employed to reduce the voltage requirements of FFP locking circuits and expand the useful temperature range for an FFP filter. A significantly improved temperature compensated filter will have a wavelength drift magnitude of less than or equal to 0.1 FSR/ 15° C.

Figure 4:
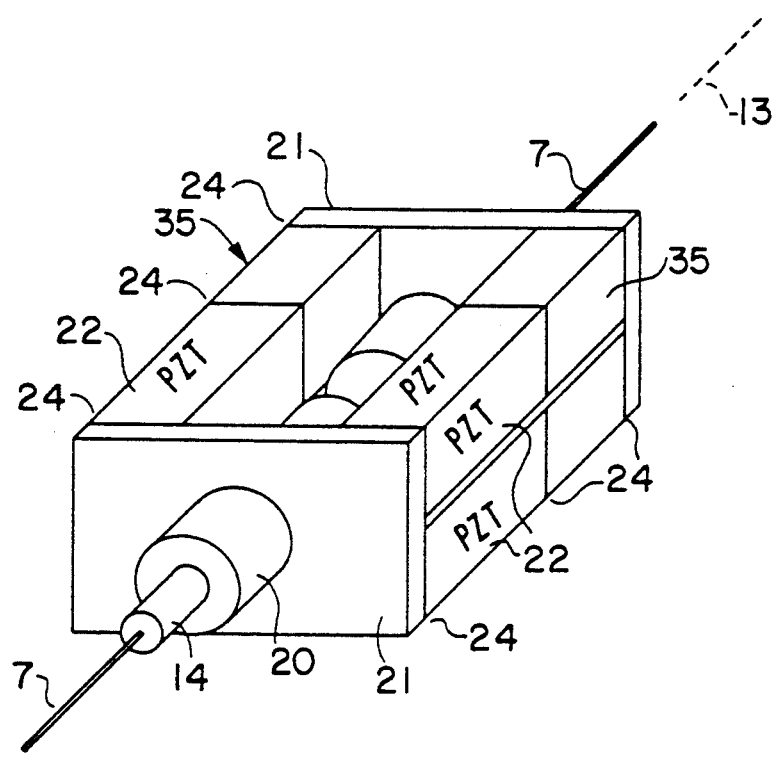
FIG. 4 is a perspective representation of a prior art FFP having passive temperature compensation using aluminum blocks.
Figure 5:
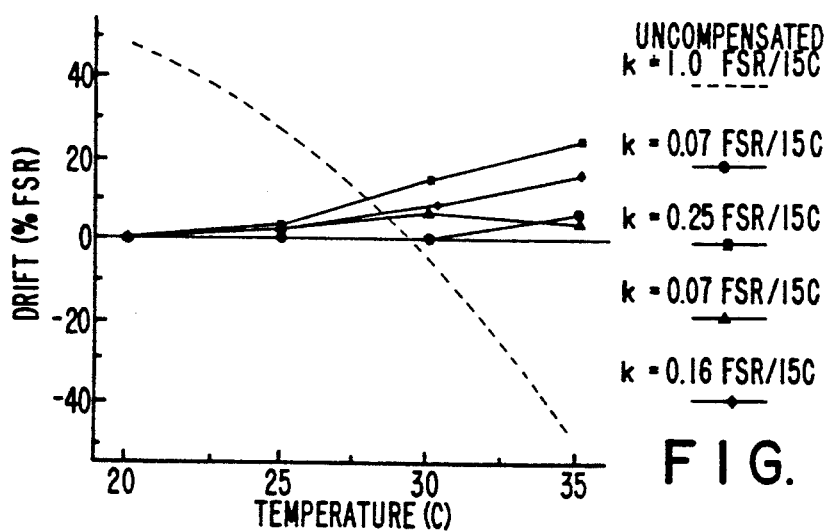
FIG. 5 is a graph comparing wavelength drift as a function of temperature in four FFPs passively temperature compensated with aluminum blocks.

FIG. 4 shows a prior art means for passive temperature compensation of a filter like that of FIG. 3. A material having a positive temperature coefficient, for example an aluminum block (35), is connected in series with the PZTs (22) within the brackets (21) of the support in order to balance the negative temperature coefficient of the PZT. The aluminum blocks are bonded to the PZTs and the brackets of the fixture using epoxy (24). FIG. 5 shows wavelength drift, as the variation of intensity at a particular wavelength, with temperature over an approximately 15° C. range at about room temperature (20° C.-35° C.) of four different aluminum block compensated filters of FIG. 4. The reproducibility of a method for construction a temperature compensated FFP can be assessed by determining an average temperature coefficient of a number of FFPs prepared employing that method. The four FFPs assessed in the graph of FIG. 5 give an average temperature coefficient of 0.13 FSR/15°0 C.

While wavelength drift could be reduced significantly, to 0.1 FSR/15° C. or below, using the passive temperature compensation displayed in FIG. 5, there was a significant variation in wavelength drift from filter to filter. Only two of the filters constructed with aluminum compensator blocks examined in FIG. 5 showed significant improvement in wavelength drift of 0.1 FSR/15° C. or less. The production yield of FFPs temperature compensated using aluminum blocks which have wavelength drift less than or equal to 0.1 FSR/15° C. is very low.

In the passively compensated filters of FIG. 4, an aluminum block (35) is typically bonded between the PZT and the support bracket employing an epoxy adhesive. An important feature of this invention is the discovery that the amount and type of epoxy employed can significantly affect the temperature coefficient of the FFP. Epoxys that are appropriate for use in attaching the PZTs and aluminum blocks in FFPs have a very high positive temperature coefficient. Even small variations in the amount of epoxy used in the construction of FFPs lead to significant variation in their temperature coefficients. The thickness of the epoxy layer, i.e. the amount of epoxy, used in joints between parts of the filter must be precisely controlled. In fact, it was found that the temperature coefficients of epoxys are so high that it is possible to approximately balance the negative temperature coefficient effect of the PZTs by simply using a controlled amount of epoxy in the joints (24, in FIG. 4) between the support brackets and the PZTs. The aluminum blocks of the prior art passive temperature compensated filter could thus be eliminated decreasing the size and number of components in the filter and significantly simplifying the construction of the filter and decreasing the cost of the filter.

The amount of epoxy in a joint is most easily controlled by controlling the thickness of the epoxy layer over a specified surface area. The specific amount, or thickness, of epoxy required to balance the effect of the PZTs depends most strongly on the temperature coefficient of the epoxy and the size of the PZTs used. The amount of epoxy required will depend to a lesser extent on the other materials used in the filter and generally on the design of the FFP. The ferrule supports are typically made of steel and the ferrules of Pyrex TM or quartz which are all materials having relatively low positive temperature coefficients. The amount of epoxy required to balance the temperature coefficient of a filter will be sensitive to low temperature coefficient materials present in large amounts in the support and fixture or even small amounts of high temperature coefficient materials used in the support and fixture.

The thickness of the epoxy layer required for a particular FFP design, i.e., fixture design, type of ferrules used, the size of PZTs and other materials used in the filter, is determined experimentally. The thickness of the epoxy layers used to bond the PZTs to the support brackets in a test FFP is varied until wavelength drift as a function of temperature is minimized. Preferably, epoxy thicknesses are adjusted in the test filter so that the wavelength drift of the filter is equal to or less than 0.1 FSR/15° C. FFPs of the same design as the test FFP are then constructed using the experimentally determined epoxy thicknesses which gave a minimum temperature drift in the test FFP. The thicknesses of epoxy required to bond to commercially available stacked PZTs (PZTs of the exemplified FFPs are obtained from NEC, catalog number NEC-AE0505D08), which have ends which are about 5 mm×5 mm and which are about 10 mm long, are typically in the range of 1–10 thousandths of an inch. However, the thickness of the epoxy joints in the FFP must also be such that the PZT is substantially rigidly bonded between the brackets of the supports.

Controlled epoxy thickness can be readily obtained with the use of gauge wires. Non-deformable (i.e., steel) wires of very precise gauge can be readily obtained. Steel gauge wires which have diameters between 1–10 thousandths of an inch are commercially available. To control epoxy thickness, a gauge wire is inserted between the end of the PZT (22) and the bracket (21) to which it is to be bonded. A drop of epoxy is applied in the joint sufficient to cover the entire area of the joint. The area of the joint typically corresponds to the area of the end of the PZT. Uniform pressure is applied across the joint and excess epoxy which is squeezed out of the joint on application of a uniform pressure is removed. A uniform controlled thickness of epoxy results after curing of the epoxy. It has been found that non-deformable steel gauge wires are suitable non-deformable spacers for forming the desired controlled thickness epoxy layers. The size of the gauge wire required to achieve the required epoxy thickness for minimal wavelength drift is determined experimentally in test FFPs. Thereafter the FFPs are constructed employing the experimentally selected diameter gauge wires. It is not necessarily the case that the thicknesses of the epoxy layers is equal to the diameter of the gauge wire. However, the use of the same gauge of wire will give reproducibly controlled thicknesses of epoxy in FFP joints. This method employing experimentally selected steel gauge wires and the application of uniform manual force was found to result in FFPs with substantially reproducible low temperature coefficients. Consistency in manufacture may be further improved by application of uniform mechanical force across the joints, such as by the application of adjustable clamps or like devices.

In a passively temperature controlled FFP with controlled epoxy thicknesses, the PZTs are bonded between the aligned support brackets of each ferrule support of the filter and each filter typically has two or more PZTs. The PZT adhesively attached to the brackets such that on application of a voltage to the PZT it stretches (or contracts) longitudinally to change the distance between the support brackets and thereby change the resonance cavity length and tune the filter. PZTs are preferably positioned in a symmetric arrangement around the longitudinal axis of the ferrule assembly so that the resonance cavity is essentially stretched along the axis of he optical fibers without substantial detriment to optical fiber alignment.

The type of epoxy used is selected such that a layer that is thick enough to balance the negative temperature coefficient of the PZTs is thick enough to provide a good bond.

In general, any means for obtaining a controlled thickness of adhesive (or a controlled amount of adhesive) in a joint can be employed in the construction of temperature compensated filters of this invention. For example, the face of the bracket to which the PZT will be bonded can be provided with a precisely machined groove for receiving and positioning the PZT. In addition, one or more spacing ridges can be precisely machined on the face of the support bracket to serve as a nondeformable spacer for generating an epoxy joint of uniform thickness.

Figure 6:
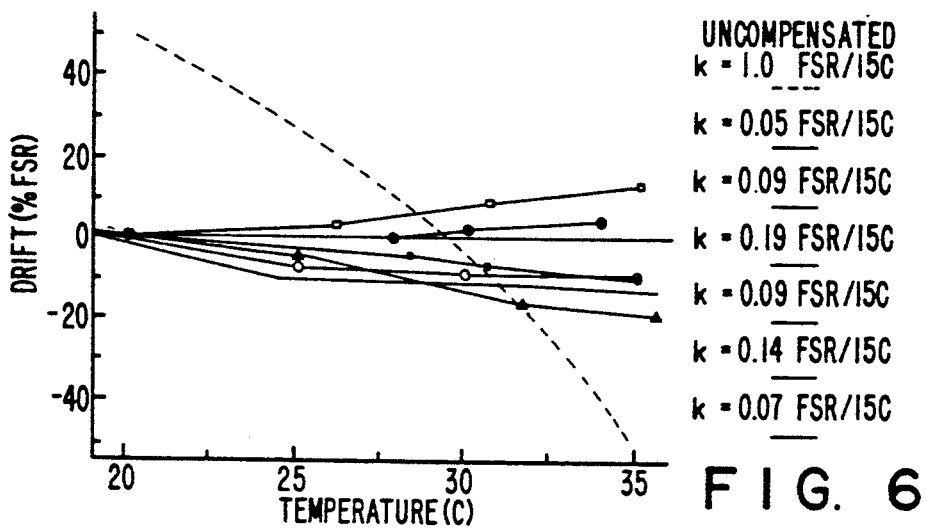
FIG. 6 is a graph comparing wavelength drift as a function of temperature in six passively temperature compensated FFPs employing controlled thicknesses of epoxy.

FIG. 6 is a graph showing the cavity length temperature coefficients of several FFPs which were temperature compensated using a controlled layer of epoxy in the joints between the PZTs and the ferrule support brackets. The filters assessed in the graph of FIG. 6 are identical in structure to the filter of FIG. 4 except that gauge wires were employed to control the epoxy thicknesses in the joints at either end of a PZT to support brackets. The filters assessed in the graph of FIG. 6 have four PZTs with dimensions 5 mm×5 mm×10 mm. The epoxy thicknesses of the joints to the PZT, required to minimize temperature drift, were determined experimentally in a test filter, and the remaining filters were constructed using the same size gauge wires to control joint thickness. In this particular set of filters, gauge wire of diameter 4 thousandths of an inch was employed on the joint at one end of the PZT and a gauge wire of diameter 6 thousandths of an inch was employed in the joint at the other end of the PZT. The gauge wires remain in place in the joints after the epoxy is cured. The adhesive thicknesses required are dependent on the materials employed in the filter and the exact dimensions of the filter components and are most preferably empirical determined in a test filter as described herein.

The average magnitude of the thermal variation among the temperature compensated filters of the graph of FIG. 6 was 0.11 FSR/15° C. Several of the filters assessed in FIG. 6 had temperature drifts of greater than 0.1 FSR/15° C. The variations observed are believed to result from small differences in the size of the filter elements and in the amount of epoxy actually in the joints. While there remains some variation in temperature coefficients for these filters, the production yield of temperature compensated filters having temperature drift less than about 0.1 FSR/15° C. using controlled epoxy thicknesses is about twice that of FFPs temperature compensated using aluminum blocks.

Although controlling the epoxy used for attaching PZTs to the FFP support brackets can result in FFPS with adequately low wavelength drift of 0.1 FSR/15° C. or less, it was found that there could still be an undesirable level in variation in the temperature coefficients of controlled epoxy FFPs and loss in yield since a number of the FFPs had higher than desired wavelength drift with temperature. Further improvements in production yield were obtained by introducing a means for adjusting the temperature coefficient after filter construction.

Figure 7A:
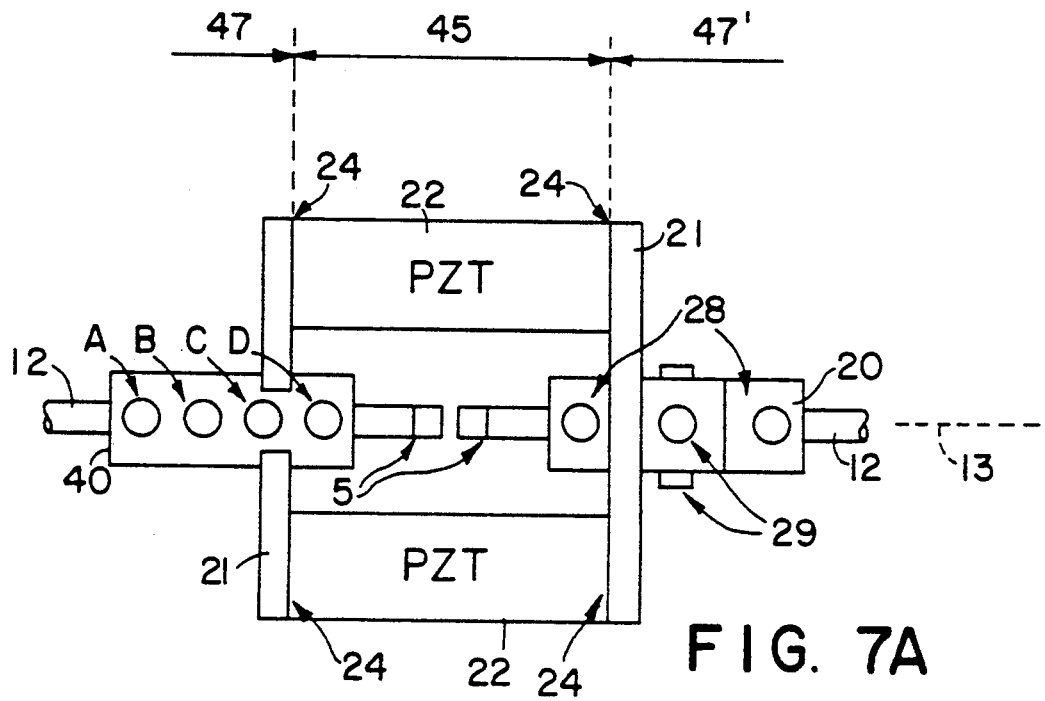
FIGS. 7A and 7B are schematic diagrams of FFPs of this invention which combine passive temperature compensation with a means for adjusting the cavity length temperature coefficient of the filter.
Figure 7B:
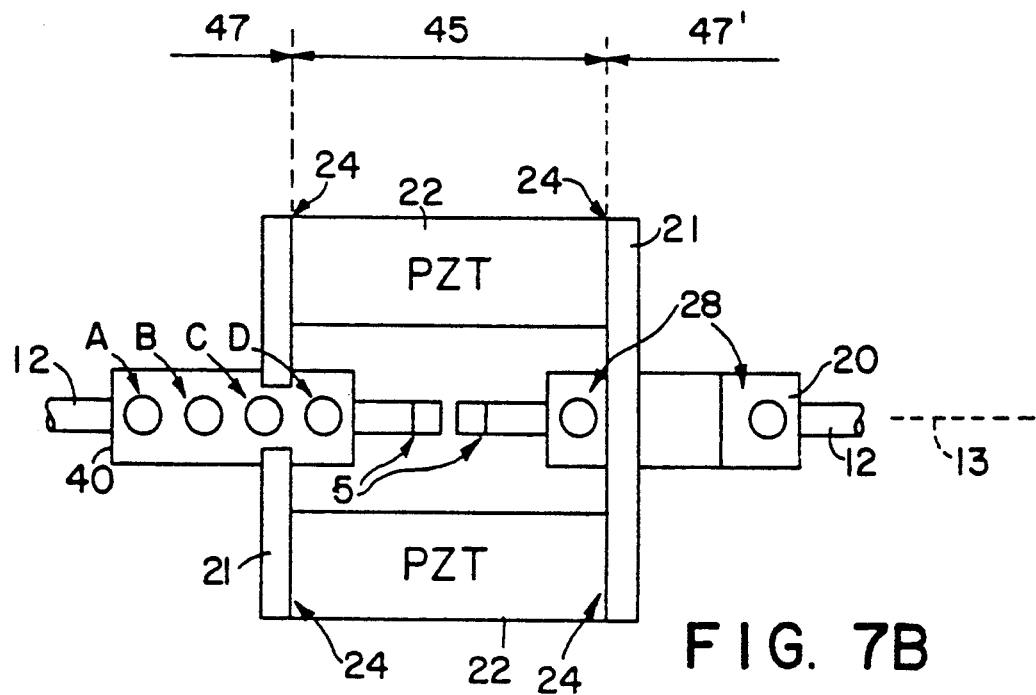

FIGS. 7A and 7B are schematic drawings of FFPs of this invention which combine passive means for temperature compensation including an adjustable means for changing the temperature compensation. These FFPs are similar to the prior art FFP of FIG. 3A in that they have alignment fixtures composed of brackets (21) and bridging PZTs (22). The FFP of FIG. 7A contains a filer gap while that of FIG. 7B has a continuous filer (37) through the optical cavity. The FFPs of FIG. 7, however, combine a ferrule support having a means for adjusting the relative alignment of the ferrules in the filter, like that of FIG. 3B, with a second ferrule support (40) which provides a means for adjusting the temperature coefficient of the FFP. The FFPs of FIG. 7 also have the passive temperature compensation feature of using controlled epoxy layers at the joints (24) between the PZTs (22) and the brackets (21). Ferrule support 40 is detailed in FIG. 8.

The ferrule support (40) of FIG. 8 has a cylindrical passageway (41) for directly receiving the ferrule (12) and comprises a plurality of mounting screws (A, B, C, D) which traverse the support body (42) and which when tightened enter the support passageway to contact the ferrule holding it securely within the support. The support has mounting screws along the length (23) of the support preferably entering the passage from the same direction. As shown in FIGS. 7A and 7B, the joints between the brackets and the PZTs define an inboard (45) and outboard regions (47 and 47') of the FFP. There is thus, as indicated in FIG. 8, an inboard region (45) of the ferrule support inside of the brackets and an outboard region of the ferrule support outside of those brackets (47).

The means for adjustment of wavelength drift in the filter (FIG. 8) comprises a means for varying the contact points between the ferrules and the ferrule support along the support passageway. At least one contact point is in the inboard region of the support and at least one contact point is in the outboard region of the support. In general, means are provided within the support for a plurality of contact points with the ferrule. The support preferably has means for making more than two contacts with the ferrule within the support. The ferrule support exemplified in FIG. 8 has four mounting screws, which define four contact points with the ferrule within the support. Three of the mounting screws (A, B, C) are in the outboard region and one mounting screw (D) is in the inboard region. Changing the position of the contact points between the ferrule and the support body increases or decreases the amount of positive temperature coefficient material that contributes to the overall cavity length temperature coefficient of the filter.

Figure 9:
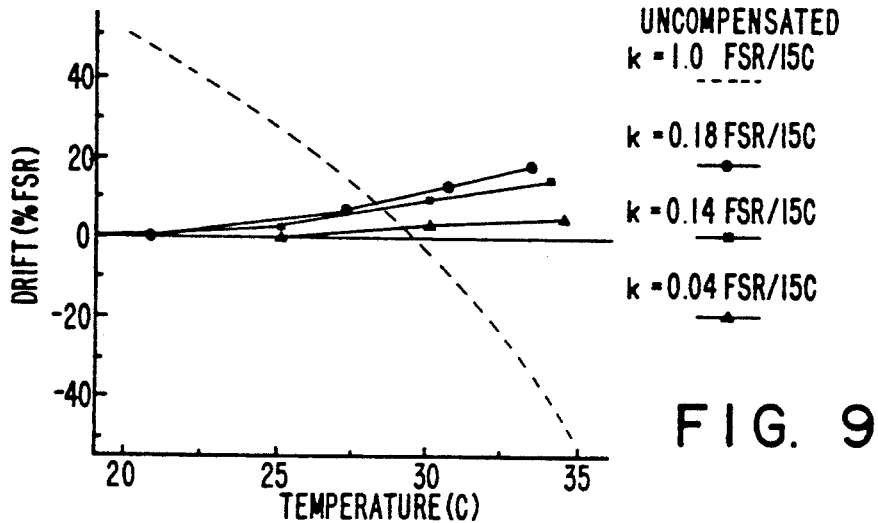
FIG. 9 is a graph comparing wavelength drift as a function of temperature in a FFP of this invention in which the temperature coefficient is adjustable. The graph shows the effect of changing the points of contact between the ferrule in the filter.

The operation of the adjustable temperature coefficient feature of the FFP of FIG. 7 and the support of FIG. 8 can be better understood on reference to FIG. 9. This figure is a graph which demonstrates how wavelength drift of an FFP of FIG. 7A can be decreased by changing the points of contact between a ferrule and a support.

A filter like those of FIG. 7 is constructed by first determining the amount of positive temperature coefficient adhesive required to balance the negative temperature coefficient of the PZTs. This is done in a test filter as described above. The amount of adhesive is readily controlled by controlling the thickness of the adhesive layers between the ends of the PZTs and the brackets of the supports using gauge wires, for example. The filter assessed in FIG. 9 had controlled layers of epoxy attaching the PZTs to the brackets of the support. Epoxy layers were controlled by use of steel gauge wire spacers inserted between the surfaces to be bonded (PZT ends and support bracket faces). The filter assessed in FIG. 9 employed four PZTs (obtained from NEC, NEC catalog number NEC AE0505D08, 5 mm×5 mm×10 mm) and the epoxy thicknesses in the two bonds affixing the PZT to the support brackets were determined by gauge wires of precise known diameter. In this case, gauge wires of diameters of 4 and 6 thousandths of an inch were used on either side of the PZT.

FFPs of FIG. 7A were constructed and the layers of epoxy bonding the PZTs to the support brackets were adjusted based on experiments with a test filter to approximately balance the negative temperature coefficient of the PZTs. The epoxy layers were adjusted with all mounting screws of support 40 (FIG. 8) tightened in contact with the ferrule. One of the filters so constructed was found to have an undesirable high wavelength drift of 0.18 FSR/15° C. (FIG. 9, closed circles). Loosening outboard screw C in that filter resulted in a very small decrease in magnitude of wavelength drift to 0.14 FSR/15° C. Loosening outboard screws C and B decreases wavelength drift to 0.04 FSR/15° C., which is within the desired range. Thus, with two adjustments, the undesirable high temperature coefficient of the FFP was reduced significantly to a desirably level.

The temperature compensated FFPs described herein were constructed at normal room temperatures. The empirical balancing of temperature coefficients of the filters described herein was assessed within the expected normal operational temperatures (0° C. -75° C.) of the filter as indicated in the graphs presented herein, temperature drift was typically assessed by heating the test FFP above room temperature.

The FFPs of this invention can employ any type of PZT means which transforms electrical energy into mechanical energy by utilizing the piezoelectric longitudinal effect. PZTs employed are preferably stacked PZTs. PZTs elongate on application of an electric field and the elongation is proportional to the applied field. In a stacked PZT about 10 mm long, as those exemplified herein, application of about 50V to the PZT results in an elongation of about 2–3 $\mu$m. Electrostrictive materials which elongate on application of a field, but in which the elongation is proportional to the square of the applied field can also be employed in the FFPs of this invention to vary cavity length. Like PZTs, electrostrictive materials will display negative temperature coefficients, the effect of which can be compensated as described herein specifically for PZTs.

The FFPs of this invention can employ any type of fiber ferrule that is useful in an FFP. The FFPs herein can combine any means of passive temperature compensation with the means for adjustment of the temperature coefficient that is disclosed herein. The methods for passive temperature compensation described herein can be employed alone or in combination with the methods for adjustment of temperature drift described herein. Similarly, the methods and support elements described herein for temperature coefficient adjustment in an FFP can be employed in the absence of passive temperature compensation, such as the use of aluminum blocks and/or controlled epoxy layers. It is most preferred in order to minimize drift and maximize production yield, to combine passive means and adjustable means described herein. The temperature compensated FFPS of this invention can be employed in combination with wave-locking circuitry as is know in the art.

Details of construction of FFPs, the preparation of ferrules including wafered ferrules, the deposition of mirrors and techniques for alignment of ferrules are known in the art or have been described variously in U.S. patent application Ser. Nos. 07/821,484 and 07/801,450 and U.S. Pat. No. 5,062,684, all of which are incorporated by reference, in their entirety, herein. Means for adjusting the relative alignment of ferrules within an FFP have been disclosed in EPO published application 457,484. The means and alignment fixtures described therein can be combined with the temperature compensation methods and means described herein. EPO 457,484 is incorporated by reference herein.

The means for securing the ferrules within the ferrule support and the means for varying the contact points between the ferrule and the support body preferably do not scratch or damage the ferrule. For example, copper-tip mounting screws can be used to avoid such ferrule damage.

The terms "precision", "precisely controlled" and "to high tolerance" as employed herein as used with in reference to alignment fixtures, spacers and machining and refer to machining to a minimum precision of about 0.0001 inch (1/10 mil).

The term optical as used in "optical fiber", "optical cavity" or "optical transmission", herein, refers to electromagnetic radiation having a wavelength such that the radiation can be transmitted by means of dielectric fibers with loss less than 25 db/Km. Presently, wavelengths in the range of 400 to 2,000 nm can be transmitted by optical fibers. The term "optically continuous" refers to optical fibers through which an optical signal can be transmitted. An optically continuous fiber may contain fiber ends or small fiber gaps so long as an optical signal can traverse the fiber.

As will be appreciated by those in the art, chromatic dispersion, waveguide dispersion, inaccuracies in spectrum analysis, and errors in measurement can add to the measured variation in FSR as a function of wavelength. Methods for the minimization of such dispersion effects and inaccuracies are well-known in the art. It is also well-known in the art that the wavelength range over which a FFP is operable (operable wavelength range) is limited by the wavelength dependence of the mirrors employed.

One of ordinary skill in the art will appreciate that the configurations, materials and techniques specifically described and exemplified herein can be modified, altered or adapted to achieve the objectives of this invention. All such alterations and modifications that embody the principles of this invention are encompassed within the spirit and scope of this invention.

We claim:

1. A temperature compensated fiber Fabry-Perot filter which comprises:
   a fiber ferrule assembly having an optical resonance cavity therein which comprises a first and a second ferrule each of which has a substantially axial bore therethrough for receiving an optical fiber including at least one optical fiber end and each of which ferrules comprises a mirror transverse to its axial bore, said ferrules positioned with respect to each other such that said optical resonance cavity is formed between opposing reflective surfaces of said mirrors;
   a means for electronically changing the length of said optical cavity;
   a support means for holding said ferrules such that the length of said optical resonance cavity can be changed;
   an adjustable means for selectively changing the cavity length temperature coefficient of said filter after the filter has been fabricated.

2. The filter of claim 1 wherein the optical fiber of said resonance cavity comprises a fiber gap and said support means functions to hold said ferrules in relative axial alignment such that the length of said optical resonance cavity can be changed by said electronic means for changing said optical resonance cavity.

3. In an improved fiber Fabry-Perot filter of the type which comprises:
   a fiber ferrule assembly having an optical resonance cavity therein which comprises a first and a second ferrule each of which has a substantially axial bore therethrough for positioning an optical fiber including at least one optical fiber end therein and each of which ferrules comprises a mirror transverse to its axial bore at an optical fiber end said ferrules positioned with respect to each other such that the axial optical fibers therein are aligned and said optical resonance cavity is formed between opposed reflective surfaces of said mirrors, said ferrules being spaced apart such that a fiber gap exists within said optical resonance cavity; a supporting means for holding said ferrules in relative axial alignment which means allows the length of said fiber gap to be changed without substantially changing the alignment of said ferrules; an adjustable means for changing the relative axial alignment of said ferrules; and a transducer means connected to said support means across said resonance cavity for electronically changing the length of the resonance cavity, the improvement wherein said transducer means is connected to said support means employing a controlled thickness of a positive temperature coefficient adhesive wherein the thickness of said adhesive is selected such that the magnitude of the cavity length of said filter varies less than about 0.5 FSR/15° C. in the temperature range 0° C.-75° C.

4. The improved filter of claim 3 wherein said adhesive is an epoxy.

5. The improved filter of claim 4 wherein said epoxy thickness is controlled by insertion of a non-deformable gauge wire between the transducer means and the support means to which it is contained.

6. The improved filter of claim 5 wherein the thickness
of said adhesive is selected such that the magnitude of the cavity length of said filter varies less than about 0.1 FSR/15° C. in the temperature range 0° C.-75° C.

7. A temperature compensated fiber Fabry-Perot filter which comprises:

a fiber ferrule assembly having an optical resonance cavity therein which comprises a first and a second ferrule each of which has a substantially axial bore therethrough for receiving an optical fiber including at least one optical fiber end and each of which ferrules comprises a mirror transverse to its axial bore, said ferrules positioned with respect to each other such that said optical resonance cavity is formed between opposing reflective surfaces of said mirrors;

a means for electronically changing the length of said optical cavity;

a support means for holding said ferrules such that the length of said optical resonance cavity can be changed;

an adjustable means for changing the relative axial alignment of said ferrules; and an adjustable means for changing the cavity length temperature coefficient of said filter wherein the optical fiber of said resonance cavity comprises a fiber gap and said support means functions to hold said ferrules in relative axial alignment such that the length of said optical resonance cavity can be changed by said electronic means for changing said optical resonance cavity.

8. The filter of claim 7 wherein the means for electronically changing the length of the resonance cavity comprises a piezoelectric transducer element connected to said ferrule support means such that selective application of a voltage to said transducer changes the resonance cavity length without substantially changing the alignment of said ferrules.

9. The filter of claim 8 wherein said ferrule support means has substantially smooth cylindrical passages for receiving said ferrules and wherein said adjustable means for changing the cavity length temperature coefficient comprises an adjustable means for changing the points of contact between a ferrule and the passage into which it is received.

10. The filter of claim 9 wherein said adjustable means for changing the points of contact between a ferrule and the passage into which it is received comprises more than two adjustable means along the length of the support passage for securing a ferrule received within said passage.

11. The filter of claim 8 wherein said support means comprises a first ferrule support and a second ferrule support rigidly connected to each other and held in fixed relative position with respect to each other by a support bridging means, both of which supports have adjustable means for securing a ferrule therein, and wherein the relative position of said supports is such that the optical fibers of the ferrule elements held by said supports can be brought into alignment by said adjustable means for changing the relative axial alignment of said ferrule elements.

12. The filter of claim 11 wherein both of said supports have a substantially smooth cylindrical passage for receiving said ferrule element and adjustable means within said supports for securing said ferrule element in said passage.

13. The filter of claim 12 wherein said adjustable means for changing the relative axial alignment of said ferrule elements is in said first ferrule support and said adjustable means for changing the cavity length temperature coefficient is in said second ferrule support.

14. The filter of claim 13 wherein said means for changing the cavity length temperature coefficient comprises an adjustable means for changing the points of contact between a ferrule and the passage into which it is received and which thereby also functions as said means for securing a ferrule in a support passage.

15. The filter of claim 14 wherein said means for changing the points of contact between a ferrule and said support passage comprises more than two adjustable means along the length of said passage for securing a ferrule held within said passage.

16. The filter of claim 11 wherein said bridging means comprises a plurality of brackets extending outwardly from each of said supports with a piezoelectric transducer bonded between corresponding brackets of each of said supports.

17. The filter of claim 16 wherein said piezoelectric transducer is a single cylindrically-shaped piezoelectric transducer.

18. The filter of claim 16 wherein said piezoelectric transducers are bonded to said brackets employing a controlled thickness of an adhesive having a positive temperature coefficient.

19. The filter of claim 18 wherein said adhesive is an epoxy.

20. The filter of claim 19 wherein both of said supports have substantially smooth cylindrical passages for receiving said ferrules and wherein said adjustable means for changing the relative axial alignment of said ferrules is in said first ferrule support and said adjustable means for changing the cavity length temperature coefficient is in said second ferrule support.

21. The filter of claim 20 wherein said adjustable means for changing the cavity length temperature coefficient in said second support comprises a means for changing the points of rigid contact between a ferrule with a support.

22. The filter of claim 21 wherein said adjustable means for changing the points of rigid contact between a ferrule and a support comprises a plurality of adjustable means along the length of a support passage for securing said ferrule held within said passage.

23. The filter of claim 22 wherein said adjustable means for changing the points of rigid contact between a ferrule and a support comprises more than two adjustable means along the length of a support passage for securing a ferrule held within said passage.

24. The filter of claim 22 wherein said brackets extending outwardly from each of said supports are perpendicular to the longitudinal axis of the cylindrical passage of the support and extend from a point on the support along the length of said passage with the portion of the passage extending between the support brackets designated the inboard portion and the remaining portions of the passage extending from each bracket away from the other support designated an outboard portion wherein in said second support said plurality of adjustable means for securing said ferrule element along the length of said passage includes adjustable means for securing said ferrule element along said inboard portion and along said outboard portion of said passage.

25. The filter of claim 24 wherein said adjustable means for changing the cavity length temperature coefficient in said second support comprises a plurality of mounting screws which can be independently adjusted by turning to extend through the body of a support into a support passage to rigidly contact and secure the ferrule therein.

26. The filter of claim 25 wherein said second ferrule support comprises more than two independently adjustable mounting screws.

27. The filter of claim 26 wherein said ferrule support comprises four independently adjustable mounting screws.

28. The filter of claim 27 wherein said independently adjustable mounting screws extend into said passageway from the same direction.

29. The filter of claim 26 wherein said cylindrical passageway of said first support comprises a transitorily deformable sleeve for receiving a ferrule therein and wherein said adjustable means for changing the relative axial alignment of said ferrule in said first support comprises a means for selectively deforming said sleeve such that the sleeve contacts the ferrule therein to change the relative alignment of the optical fibers of said filter.

30. The filter of claim 29 wherein said means for selectively deforming the sleeve of said first support comprises a plurality of alignment screws which extend through the body of said first support contacting said sleeve wherein adjustment of said screws by turning deforms said sleeve to thereby change the relative axial alignment of the optical fibers of said ferrule.

31. The filter of claim 30 wherein said alignment screws are symmetrically disposed in said first support around the circumference of said passage.

32. The filter of claim 31 wherein said first and second supports each have four brackets and a piezoelectric transducer connects corresponding aligned brackets of each support.

33. A temperature compensated fiber Fabry-Perot filter which comprises:

a fiber ferrule assembly having an optical resonance cavity therein which comprises a first and a second ferrule each of which has a substantially axial bore therethrough for receiving an optical fiber including at least one optical fiber end and each of which ferrules comprises a mirror transverse to its axial bore, said ferrules positioned with respect to each other such that said optical resonance cavity is formed between opposing reflective surfaces of said mirrors;

a means for electronically changing the length of said optical cavity;

a support means for holding said ferrules such that the length of said optical resonance cavity can be changed; and an adjustable means for changing the cavity length temperature coefficient of said filter, wherein said optical resonance cavity comprises a continuous optical fiber and wherein said support means functions to hold said ferrules in said support in relative position such that the length of said continuous optical fiber is changed by means of application of an electric field to said means for electronically changing the length of said optical resonance cavity.

34. The filter of claim 33 wherein said means for electronically changing the length of said optical cavity comprises a piezoelectric transducer element connected to said support means.

35. The filter of claim 34 wherein said ferrule support means has substantially smooth cylindrical passages for receiving said ferrules and wherein said adjustable means for changing the cavity length temperature coefficient comprises an adjustable means for changing the points of contact between a ferrule and the passage into which is received.

36. The filter of claim 35 wherein said adjustable means for changing the points of contact between a ferrule and the passage into which it is received comprises more than two adjustable means along the length of the support passage for securing a ferrule received within said passage.

37. The filter of claim 36 wherein said support means comprises a first ferrule support and a second ferrule support rigidly connected to each other and held in fixed relative position with respect to each other by a support bridging means, both of which supports have adjustable means for securing a ferrule therein and wherein said bridging means comprises a plurality of brackets extending outwardly from each of said supports with a piezoelectric transducer bonded between corresponding brackets of each of said supports employing a controlled thickness of an epoxy having a positive temperature coefficient.

* * * * *